United States Patent
Liu

(10) Patent No.: US 12,530,121 B2
(45) Date of Patent: Jan. 20, 2026

(54) MANAGING OPERATIONS IN MEMORY SYSTEMS

(71) Applicant: Yangtze Memory Technologies Co., Ltd., Hubei (CN)

(72) Inventor: Weilin Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/296,206

(22) Filed: Apr. 5, 2023

(65) Prior Publication Data
US 2024/0302966 A1   Sep. 12, 2024

Related U.S. Application Data

(63) Continuation of application No. PCT/CN2023/080077, filed on Mar. 7, 2023.

(51) Int. Cl.
G06F 3/06 (2006.01)

(52) U.S. Cl.
CPC .......... G06F 3/0611 (2013.01); G06F 3/0656 (2013.01); G06F 3/0659 (2013.01); G06F 3/0679 (2013.01)

(58) Field of Classification Search
CPC .... G06F 3/0659; G06F 3/0679; G06F 3/0611; G06F 3/0658; G06F 3/0656
USPC ....................................................... 711/103
See application file for complete search history.

(56) References Cited

U.S. PATENT DOCUMENTS

| | | | |
|---|---|---|---|
| 2007/0239926 A1 | 10/2007 | Gyl et al. | |
| 2010/0268871 A1 | 10/2010 | Lee et al. | |
| 2012/0179860 A1* | 7/2012 | Falanga | G11C 16/102 711/155 |
| 2013/0205085 A1* | 8/2013 | Hyun | G06F 3/0679 710/5 |
| 2017/0194053 A1* | 7/2017 | Micheloni | G11C 16/26 |

(Continued)

FOREIGN PATENT DOCUMENTS

| CN | 102598141 A | 7/2012 |
|---|---|---|
| CN | 110147205 | 8/2019 |

(Continued)

OTHER PUBLICATIONS

Office Action in Taiwanese Appln. No. 11320222460, mailed on Mar. 4, 2024, 18 pages (with English machine translation).

(Continued)

*Primary Examiner* — Hashem Farrokh
(74) *Attorney, Agent, or Firm* — Fish & Richardson P.C.

(57) ABSTRACT

Methods, systems, and apparatus, including computer programs encoded on computer storage media, for management of suspend and resume operations in a memory system are described. An example system includes a memory device and a controller. The controller is configured to: while performing data transfer to the memory device for a first operation corresponding to a first command, check whether a second command is received, wherein performing the data transfer to the memory device comprises performing the data transfer in terms of allocation units (AUs). In response to determining that the second command is received and that data transfer in a current AU is completed, the controller sends a suspend command to the memory device.

20 Claims, 8 Drawing Sheets

(56) References Cited

U.S. PATENT DOCUMENTS

| | | | |
|---|---|---|---|
| 2018/0157498 A1* | 6/2018 | Borlick | G06F 11/106 |
| 2019/0087101 A1* | 3/2019 | Endo | G06F 3/0611 |
| 2019/0227745 A1 | 7/2019 | Hong et al. | |
| 2021/0142855 A1 | 5/2021 | Na et al. | |
| 2022/0171571 A1 | 6/2022 | Kang et al. | |
| 2022/0300194 A1* | 9/2022 | Shridhar | G06F 3/0656 |

FOREIGN PATENT DOCUMENTS

| | | |
|---|---|---|
| JP | 2001318787 | 11/2001 |
| JP | 2011059979 | 3/2011 |
| JP | 2019-029045 A | 2/2019 |
| JP | 2019-057147 A | 4/2019 |
| JP | 2021-190150 A | 12/2021 |
| KR | 20080099336 | 11/2008 |
| KR | 102088945 | 4/2020 |
| KR | 20210057355 | 5/2021 |
| TW | 201901446 | 1/2019 |
| TW | 202016738 | 5/2020 |
| WO | WO 2016071954 A1 | 5/2016 |

OTHER PUBLICATIONS

International Search Report and Written Opinion in International Appln. No. PCT/CN2023/080077, mailed on Aug. 29, 2023, 16 pages.
Office Action in Korean Appln. No. 10-2023-7020581, mailed on Sep. 12, 2024, 17 pages (with English machine translation).
EP Communication Pursuant to Article 94(3) EPC in European Appln No. 23710959.0, dated Jul. 24, 2024, 10 pages.
Communication Pursuant to Article 94(3) EPC in European Appln. No. 23710959.0, mailed on Jan. 22, 2025, 10 pages.
Notification of Reasons for Refusal in Taiwanese Appln. No. 112125164, mailed on Mar. 19, 2025, 8 pages (with machine translation).
Office Action in Taiwanese Appln. No. 112125164, mailed on Oct. 8, 2024, 11 pages (with machine translation).
Communication Pursuant to Article 94(3) in European Appln. No. 23710959.0, mailed on Jul. 21, 2025, 7 pages.
Office Action in Japanese Appln. No. 2023-539175, mailed on Apr. 30, 2025, 11 pages (with English machine translation).
Office Action in Chinese Appln. No. 202380008723.3, mailed on Sep. 10, 2025, 23 pages (with English translation).

* cited by examiner

MANAGING OPERATIONS IN MEMORY SYSTEMS

CROSS-REFERENCE TO RELATED APPLICATIONS

This application is a continuation of International Application No. PCT/CN2023/080077, filed on Mar. 7, 2023, the disclosure of which is hereby incorporated by reference in its entirety.

TECHNICAL FIELD

The present disclosure generally relates to a memory system, and more specifically, to management of suspend and resume operations of a memory system.

BACKGROUND

A memory system can include one or more memory components that store data. The memory components can be, for example, non-volatile memory components and volatile memory components. In general, a host system can utilize a memory system to store data in the memory components and retrieve data from the memory components.

SUMMARY

The present disclosure describes management of suspend and resume operations in a memory system.

In one aspect, for example, the present disclosure describes a system that includes a memory device and a controller. The controller is configured to: while performing data transfer to the memory device for a first operation corresponding to a first command, check whether a second command is received, wherein performing the data transfer to the memory device comprises performing the data transfer in terms of allocation units (AUs); and in response to determining that the second command is received and that data transfer in a current AU is completed, send a suspend command to the memory device. The memory device is configured to: in response to receiving the suspend command from the controller, suspend data reception for the first operation; allocate a buffer space for a second operation corresponding to the second command; perform the second operation using the buffer space allocated for the second operation; and return an execution result of the second operation to the controller.

In another aspect, the present disclosure describes a method performed by a system that includes a memory device and a controller. The method includes: while performing data transfer to the memory device for a first operation corresponding to a first command, checking, by the controller, whether a second command is received, wherein performing the data transfer to the memory device comprises performing the data transfer in terms of AUs; in response to determining that the second command is received and that data transfer in a current AU is completed, sending, by the controller, a suspend command to the memory device; in response to receiving the suspend command from the controller, suspending, by the memory device, data reception for the first operation; allocating, by the memory device, a buffer space for a second operation corresponding to the second command; performing, by the memory device, the second operation using the buffer space allocated for the second operation; and returning, by the memory device, an execution result of the second operation to the controller.

In another aspect, the present disclosure describes a controller for controlling a memory device. The controller includes at least one processor coupled to at least one memory storing programming instructions that, when executed by the at least one processor, cause the controller to perform operations comprising: while performing data transfer to the memory device for a first operation corresponding to a first command, checking whether a second command is received, wherein performing the data transfer to the memory device comprises performing the data transfer in terms of AUs; and in response to determining that the second command is received and that data transfer in a current AU is completed, sending a suspend command to the memory device.

In still another aspect, the present disclosure describes a memory device. The memory device includes at least one processor coupled to at least one memory storing programming instructions; at least one internal memory; at least one buffer space; and an array of memory cells, and wherein the programming instructions, when executed by the at least one processor, cause the memory device to perform operations comprising: while performing data reception from a controller for a first operation corresponding to a first command, receiving a suspend command from the controller to suspend the data reception; in response to receiving the suspend command from the controller, suspending the data reception for the first operation; allocating a buffer space of the at least one buffer space for a second operation corresponding to a second command; performing the second operation using the buffer space allocated for the second operation; and returning an execution result of the second operation to the controller.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
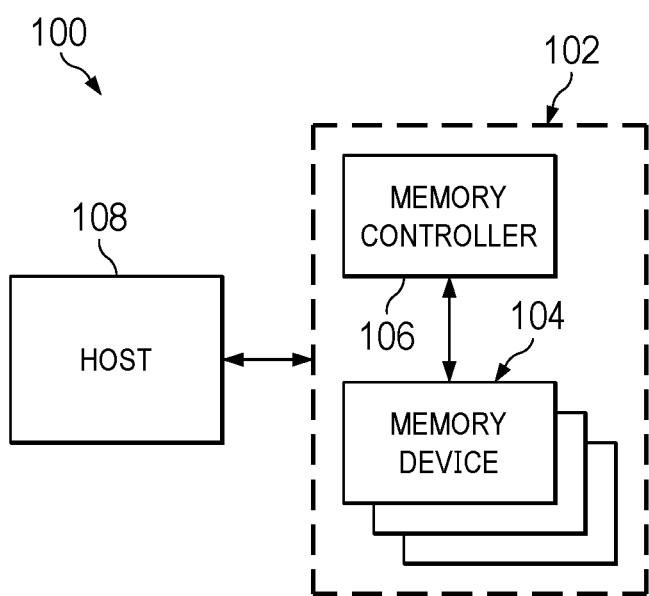
FIG. 1 illustrates a block diagram of an example system having a memory device, in accordance with some aspects of the present disclosure.

A memory system can be a storage device, a memory module, or a hybrid of a storage device and memory module. Examples of storage devices and memory modules are described below in conjunction with FIG. 1 and FIGS. 2A and 2B. In general, a host system can utilize a memory system that includes one or more memory components, such as memory devices that store data. The host system can provide data to be stored in the memory device and can request data to be retrieved from the memory device.

A memory device can include multiple memory cells. Each memory cell can be configured with a different storage mode or state such as a single-level cell (SLC) or a multi-level cell (MLC). The SLC can store only one bit per memory element, whereas the MLC is capable of storing more than a single bit of information. For example, a triple level cell (TLC) is capable of storing three bits of data, a quadruple level cell (QLC) is capable of storing four bits of data, and a penta level cell (PLC) is capable of storing five bits of data. TLC, QLC, PLC, and other cells capable of storing more than a single bit of information are collectively referred to as MLC in this specification. The state of the memory cell can be programmed, and the state of the memory cell can be determined by comparing a read voltage of the memory cell against one or more read level thresholds.

QoS (quality of service) is a key evaluation factor for memory systems. QoS metrics can include, for example, latency/response time, system throughput, and other measurements. Different QoS latency metrics or numbers can be established for various applications. For example, mixed write and read (or mixed input and output (I/O)) workload environments can include, e.g., random write/read workloads, and sequential write/read workloads. In one example, a memory system can have a QoS target of 99.9% for a mixed workload having drive capacities of a 70% write/30% write/read ratio, a 4K page size, and a queue depth=1. In another example, a memory system can have a QoS target of 99.999% for a mixed workload having drive capacities of a 70% write/30% write/read ratio, a 4K page size, and a queue depth=32.

Each programming pass performed on the memory system takes a duration of time to complete (e.g., a program time). The long program time associated with memory systems and especially MLC memory systems where more than 2 bits of information is stored per memory element, can negatively impact achievement of the associated QoS target.

In a memory system operating with a mixed workload, if a read operation request is received while a previous program operation is in progress, the read operation is forced to wait until the program operation has been completed. Due to the longer program time associated with MLC memory systems where more than 2 bits of information is stored per memory element, the read operation is delayed during that longer program time, thereby having a negative impact on the QoS latency and throughput targets.

Particular implementations of the subject matter described in this disclosure can be implemented and help realize one or more of the following advantages. In some implementations, the QoS of the memory system and user experience (e.g., in terms of system response time) for read operations (or other operations that have higher execution priorities) can be improved, as an ongoing lower-execution-priority operation (e.g., program or write operation) can be preempted by a higher-execution-priority operation. For example, a data transfer interrupt mechanism can be introduced on both the memory controller and the memory device of the memory system such that the lower-execution-priority operation (e.g., the program operation) can be suspended earlier than other memory systems that do not implement the disclosed features to perform the higher-execution-priority operation (e.g., the read operation). Further, in some cases, unlike write suspend commands that can suspend an ongoing program operation only after data transfer from the controller to the memory device is complete, e.g., but before the data is actually stored in the memory device, the techniques described in this disclosure can suspend the ongoing program operation while the data is still being transferred from the memory controller, without having to wait until the memory device finishes receiving the complete data from the controller.

In some implementations, the described techniques allow a pre-check method to be implemented at the memory controller side to ensure that handling of the read operation will preempt the program data transfer process of the program operation. In some implementations, on the memory controller side, firmware does not need to involve any additional control action, and hardware can handle the pre-check or determination. The read handle can suspend data transfer automatically to decrease the latency.

On the memory device, a page-buffer dynamic switch method can be implemented to ensure read and write operations can be mixed and handled properly. In some implementations, in the described techniques, a command-based preempt interaction mechanism is designed to avoid internal handling logical chaos on the memory device side. For example, with this feature, the memory device can automatically identify the type of operation and switch the read/program context, without breaking the internal state machine of the memory device.

In some implementations, the described techniques can reduce the stall of other memory operations, improve efficiency of handling the read command, and/or increase throughput of memory system because waiting until completion of the data transfer for an ongoing program operation can be avoided.

FIG. 1 illustrates a block diagram of an example system 100 having a memory device, in accordance with some aspects of the present disclosure. System 100 can be a mobile phone, desktop computer, laptop computer, tablet computer, vehicle computer, game console, printer, positioning device, wearable electronic device, smart sensor, Virtual Reality (VR) device, Augmented Reality (AR) device, or any other suitable electronic device having storage therein. As shown in FIG. 1, system 100 can include a host 108 and a memory system 102, memory system 102 having one or more memory devices 104 and a memory controller 106.

Host 108 can be, for example, a processor (e.g., a Central Processing Unit (CPU)) or a system on a chip (SoC) (e.g., an Application Processor (AP)) of an electronic device. Host 108 can be configured to send data to memory device 104 or receive data from memory device 104. To send data to memory device 104 or receive data from memory device 104, host 108 can send instructions to memory system 102 in addition to the data.

Memory device 104 can be any memory device disclosed in the present disclosure. As disclosed in detail below, the memory device 104 (e.g., a NAND flash memory device) can support program operation suspension triggered by interrupts.

In some implementations, memory controller 106 is coupled to memory device 104 and host 108, and is configured to control memory device 104. Memory controller 106 can manage data stored in memory device 104 and communicate with host 108. In some implementations, the memory controller 106 is designed for operation in a low duty cycle environment, such as a Secure Digital (SD) card, Compact Flash (CF) card, Universal Serial Bus (USB) flash drive, or other medium for use in electronic devices such as personal computers, digital cameras, mobile phones, and so forth. In some implementations, the memory controller 106 is designed for operation in a high duty cycle environment SSD or embedded multimedia card (eMMC) that is used as a data store and enterprise storage array for mobile devices such as smart phones, tablet computers, laptop computers, and the like.

The memory controller 106 can be configured to control the operation (e.g., read, erase, and program operations) of the memory device 104. For example, based on instructions received from host 108, memory controller 106 can transmit various commands (e.g., program commands, read commands, erase commands, etc.) to memory device 104 to control the operation of memory device 104. Consistent with the scope of the present disclosure, in some implementations, memory controller 106 transmits a program command to memory device 104 to initiate a program operation to be performed by memory device 104. During an ongoing program operation, an interrupt (e.g., a read operation to another page) may occur, for example, from host 108. Memory controller 106 may be configured to transmit an interrupt command to memory device 104 to suspend the program operation. In some implementations, upon completion of other operations triggered by the interrupt, the memory controller 106 also can be configured to transmit a resume command to the memory device 104 to resume and complete the suspended program operation.

The memory controller 106 can also be configured to manage various functions with respect to data stored or to be stored in the memory devices 104, including but not limited to bad block management, garbage collection, logical to physical address translation, wear leveling, and the like. In some implementations, the memory controller 106 is also configured to process Error Correction Codes (ECC) with respect to data read from the memory device 104 or written to the memory device 104. The memory controller 106 can also perform any other suitable functions, such as formatting the memory device 104. The memory controller 106 can communicate with external devices (e.g., the host 108) according to a particular communication protocol. For example, the memory controller 106 can communicate with the external device via at least one of various interface protocols, such as a USB protocol, an MMC protocol, a Peripheral Component Interconnect (PCI) protocol, a PCI express (PCI-E) protocol, an Advanced Technology Attachment (ATA) protocol, a serial ATA protocol, a parallel ATA protocol, a small computer system small interface (SCSI) protocol, an Enhanced Small Disk Interface (ESDI) protocol, an Integrated Drive Electronics (IDE) protocol, a Firewire protocol, and so forth.

Figure 2A:
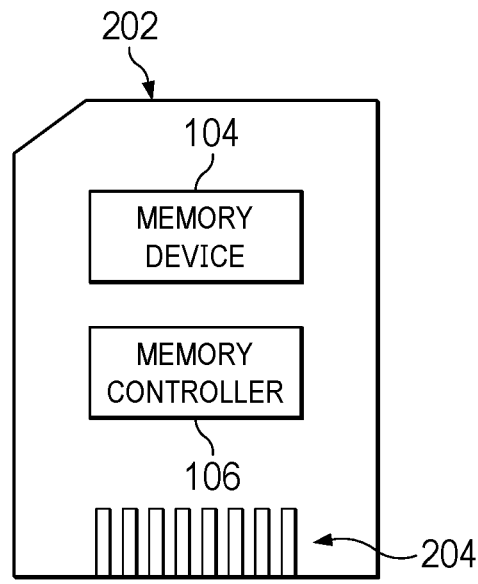
FIG. 2A illustrates a diagram of an example memory card having a memory device, in accordance with some aspects of the present disclosure.
Figure 2B:
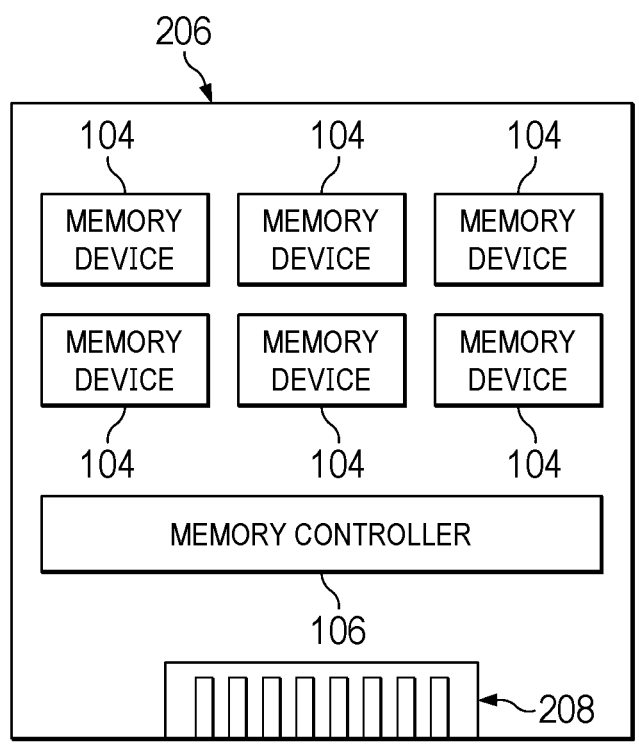
FIG. 2B illustrates a diagram of an example solid-state drive (SSD) having a memory device, in accordance with some aspects of the present disclosure.

The memory controller 106 and the one or more memory devices 104 can be integrated into various types of storage devices and can be included, for example, in the same package (e.g., a Universal Flash Storage (UFS) package or an eMMC package). That is, the memory system 102 can be implemented and packaged into different types of end electronic products. In one example as shown in FIG. 2A, the memory controller 106 and the single memory device 104 can be integrated into a memory card 202. The memory card 202 can include a PC card (PCMCIA), a CF card, a Smart Media (SM) card, a memory stick, a multimedia card (MMC, RS-MMC, MMCmicro), an SD card (SD, miniSD, microSD, SDHC), a UFS, and the like. Memory card 202 can also include a memory card connector 204 configured to couple memory card 202 to a host (e.g., host 108 in FIG. 1). In another example as shown in FIG. 2B, the memory controller 106 and multiple memory devices 104 can be integrated into the SSD 206. SSD 206 can also include an SSD connector 208 configured to couple SSD 206 to a host (e.g., host 108 in FIG. 1). In some implementations, the storage capacity and/or operating speed of SSD 206 is greater than the respective storage capacity and/or operating speed of memory card 202.

Figure 3:
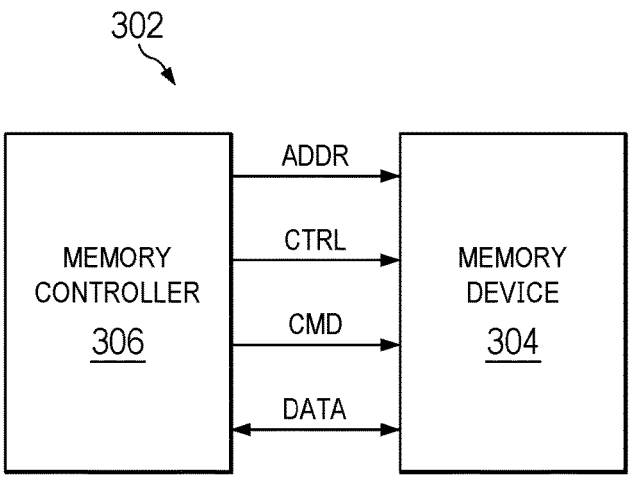
FIG. 3 illustrates a block diagram of an example memory system, in accordance with some aspects of the present disclosure.

FIG. 3 illustrates a block diagram of an example memory system 302, in accordance with some aspects of the present disclosure. As illustrated, the memory system 302 includes a memory controller 306 and a memory device 304. The memory controller 306 and memory device 304 can be example implementations of the memory controller 106 and the memory device 104 discussed in connection with FIG. 1 and FIGS. 2A and 2B.

The memory controller 306 can exchange data with the memory device 304, for example, in response to a request from a host (e.g., host 108 in FIG. 1). As an example, the memory controller 306 can read data from the memory device 304 in response to a request from the host and can provide the read data to the host. As another example, the memory controller 306 can write or program data in the memory device 304 in response to a program request from the host.

In some implementations, to perform the above-described operations, the memory controller 306 can provide signals, such as an address (ADDR), a command (CMD), and a control signal (CTRL), to the memory device 304 and can exchange data (DATA) with the memory device 304. The memory device 304 can output data or can program received data in response to the signals received from the memory controller 306.

The memory controller 306 can provide the memory device 304 with a read command, a program command, an erase command, or the like as the command. For example, the memory controller 306 can request a program operation of a word line unit of the memory device 304 through the program command. The memory controller 306 can transmit one or more addresses representing one or more word lines on which the program operation is performed such that programming is performed on memory cells on the one or more word lines of a memory block of the memory device 304 indicated by the one or more addresses ADDR. As another example, the memory controller 306 can request a read operation to read data stored in memory cells on one or more word lines of the memory device 304 through the read command. As another example, the memory controller 306 can request an erase operation to erase data programed in memory cells of one or more memory blocks or sub block units of the memory device 304 through the erase command.

Figure 4:
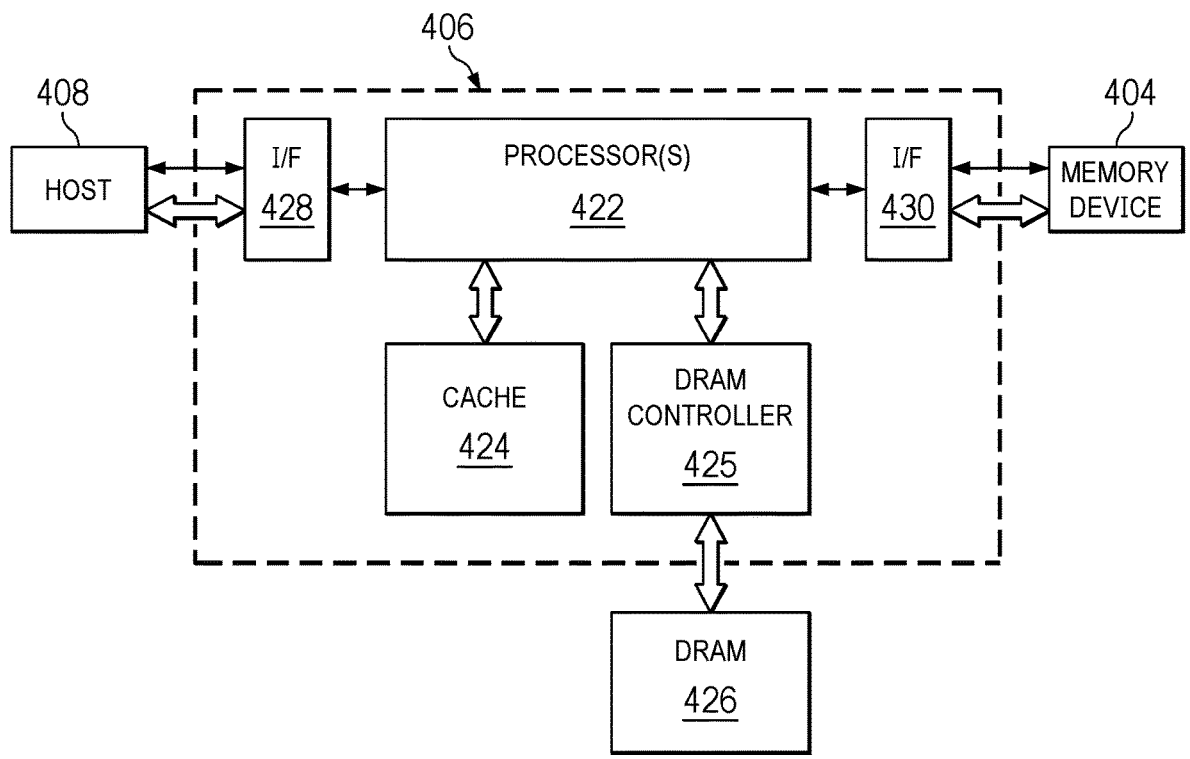
FIG. 4 illustrates a block diagram of an example memory controller, in accordance with some aspects of the present disclosure.

FIG. 4 illustrates a block diagram of an example memory controller 406, in accordance with some aspects of the present disclosure. The memory controller 406 can include one or more processors 422, and one or more memories including one or more of a cache 424 and/or another type of data store. FIG. 4 shows a Dynamic Random Access Memory (DRAM) 426 as being independent from the memory controller 406, however, in some other implementations, the DRAM 426 can be included as part of the memories included in the memory controller 406. In some implementations, the memory controller 406 can include a DRAM controller 425 for the DRAM 426. The memory controller 406 can also include an interface (I/F) 428 (also referred to as a "front-end interface") to a host 408 and an interface (I/F) 430 (also referred to as a "back-end interface") to a memory device 404. In some implementations, the interface 428 can receive instructions and data from the host 408 and forward the instructions and data to the processors 422 and the DRAM 426, respectively. In some implementations, the interface 430 can transfer control signals and data from the processors 422 and the DRAM 426, respectively, to the memory device 404.

In some implementations, the processors 422 can include an Arithmetic Logic Unit (ALU) configured to perform arithmetic and/or logical operations. The memory device 404, the one or more memories of the memory controller 406 such as the cache 424, or a combination of these can store programming instructions which, when loaded into the processors 422, can be executed by the processors 422 to perform various functions of the memory controller 406, such as the functions described in this disclosure. As an example, the memory controller 406 is configured to perform functions such as repeatedly checking whether a second command is received from the host 408 while performing data transfer to the memory device 404 for a first operation corresponding to a first command, and sending a suspend command to the memory device 404 whenever the second command is received, provided that the data transfer in a current allocation unit is completed.

Figure 5:
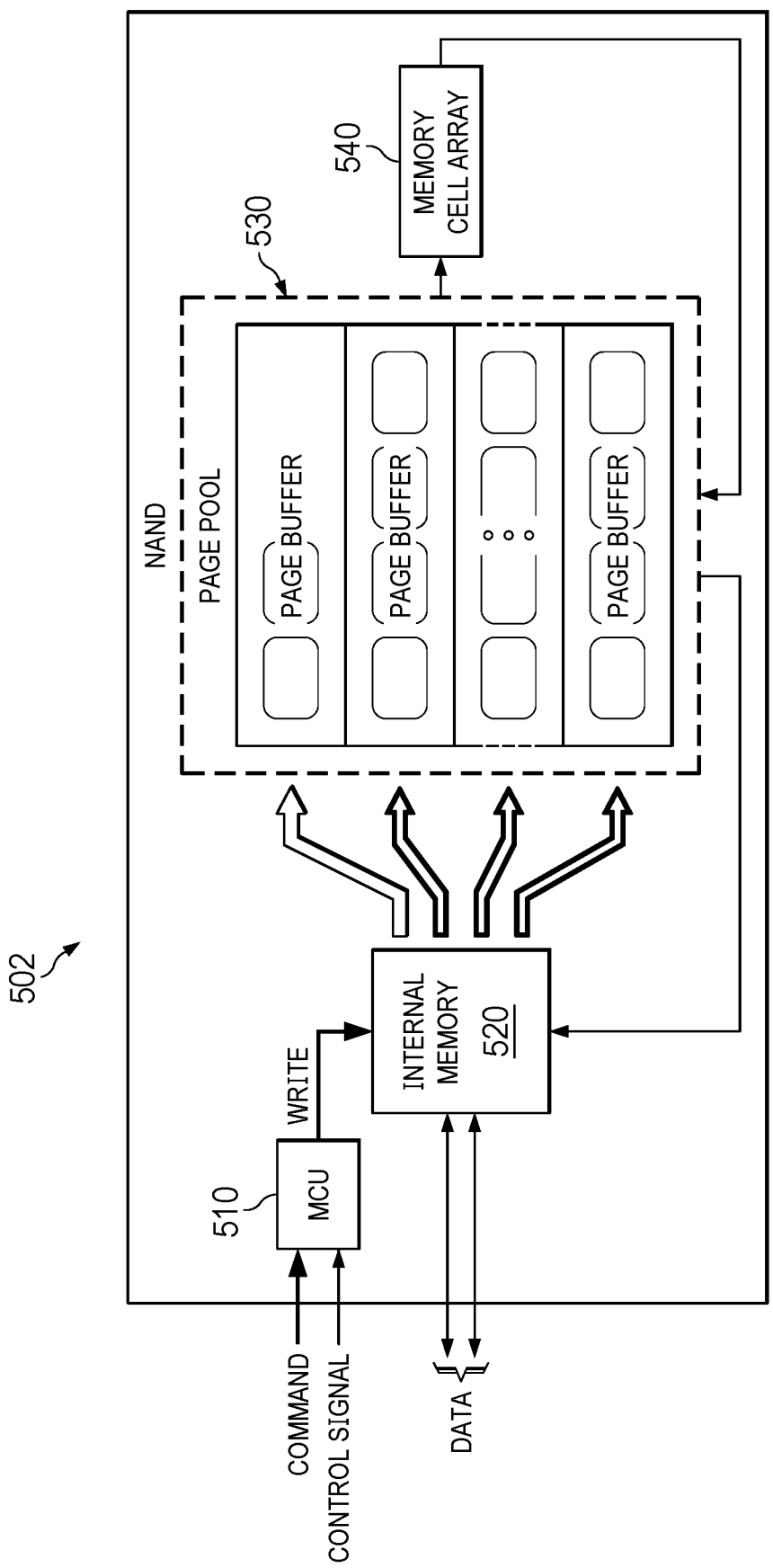
FIG. 5 illustrates a schematic diagram of an example memory device, in accordance with some aspects of the present disclosure.

FIG. 5 illustrates a schematic diagram of an example memory device 502, in accordance with some aspects of the present disclosure. The memory device 502 can be an example implementation of the memory device 104 or 304 discussed in connection with FIG. 1, FIGS. 2A and 2B, and FIG. 3. As illustrated, in some implementations, the memory device 402 includes a microcontroller unit (MCU) 510, an internal memory 520, a page pool 530, and a memory cell array 540.

Generally, the memory cell array 540 includes one or more memory planes, where each memory plane includes multiple memory blocks. In some implementations, a memory block is a basic unit or the smallest unit to carry out an erase operation. In some implementations, each memory block includes a number of pages, where each memory plane includes multiple memory cells. In some implementations, a page is a basic unit or the smallest unit that to carry out a program operation. In some implementations, memory cells of a page can share a word line.

In some implementations, the memory cell array 540 is a flash memory array, and is implemented using three-dimensional (3D) NAND flash memory technology. In these implementations, each of the memory blocks includes multiple memory cell strings that are disposed vertically (e.g., perpendicular to a main surface of a die). Each memory cell string includes multiple memory cells connected in series.

In some implementations, the MCU 510, the internal memory 520, and the page pool 530 operate as a peripheral circuit that drives the memory cell array 540. That is, the MCU 510, the internal memory 520, and the page pool 530 can function to perform a read operation, a write operation, and an erase operation on the memory cell array 540. These components perform the read operation, the write operation, and the erase operation on the memory cell array 540 based on the control of the MCU 510.

The MCU 510 can include one or more processing cores that can execute respective control software, firmware, or both of the MCU to perform functions of the MCU. The MCU 510 can receive a command CMD and/or a control signal CTRL, e.g., through an input/output buffer of the memory device 502. The MCU 510 is configured to control overall operation of the memory device 502 in response to the command CMD and/or the control signal CTRL. In an example, in response to a read command, the MCU 510 can generate control parameters for generating control signals to read data from the memory cell array 540. In another example, in response to a write or program command, the MCU 510 can generate control parameters for generating control signals to write or program data to the memory cell array 540. In another example, in response to an erase command, the MCU 510 can generate control parameters for generating control signals to erase one or more blocks of the memory cell array 540.

The internal memory 520 operates as a cache or buffer memory of the memory device 502. The internal memory 520 can be implemented, for example, as a cache buffer, page cache, or in another manner for rapid data access. For example, the internal memory 520 can temporarily store data received from the memory controller or host or can temporarily store metadata (e.g., mapping tables) of the memory cell array 540. Alternatively or additionally, the internal memory 520 can temporarily store a variety of information needed for the MCU 510 to operate. For example, the MCU 510 can search for an open memory block by using data stored in the internal memory 520.

The page pool 530 includes multiple page buffers (or page registers). The page pool 530 operates under control of the MCU 510. In some implementations, the page pool 530 is connected to the memory cell array 540 through bit lines. In some implementations, the page pool 530 is connected to the internal memory 520 through multiple data lines. The page pool 530 can store data to be programmed in memory cells of the memory cell array 540 or data read from the memory cells. During the program operation, the page pool 530 receives data to be programmed in memory cells from the internal memory 520 of the memory device 502, and stores the received data. During the read operation, the page pool 530 temporarily stores data read from the memory cells, and outputs the read data to the internal memory 520 of the memory device 502. In some implementations, the page pool 530 can include a column selection circuit, and the like, in addition to the page buffers.

Figure 6:
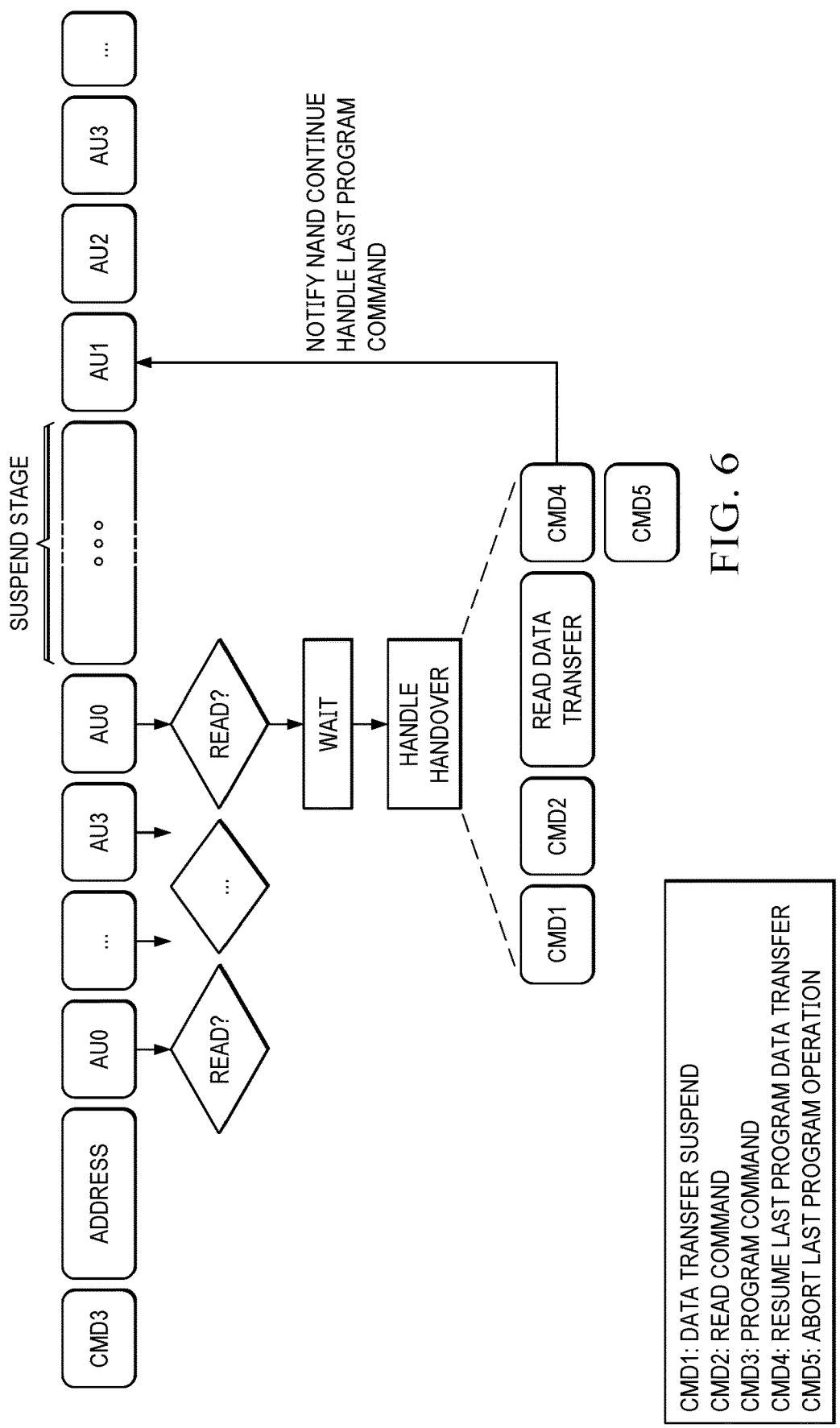
FIG. 6 illustrates an example graph of managing suspend and resume operations associated with a memory system, in accordance with some aspects of the present disclosure.

FIG. 6 illustrates an example graph of managing suspend and resume operations associated with a memory system, in accordance with some aspects of the present disclosure. From left to right, FIG. 6 illustrates a timeline of operations including those performed by a memory controller of the memory system (e.g., the memory controller 106 of the memory system 102). For example, the memory controller can perform these operations in a mixed write and read workload environment.

FIG. 6 uses CMD1-CMD5 to refer to respective commands for different operations, where CMD1 refers to a data transfer suspend command, CMD2 refers to a read command, CMD3 refers to a program command, CMD4 refers to a resume last program data transfer command, and CMD5 refers to an abort last program operation command.

As illustrated in FIG. 6, a program command to program a memory device is issued by the memory controller, e.g., in accordance with a program command from a host. In addition, one or more addresses representing one or more word lines of a memory block of the memory device on which the program operation should be performed are issued, e.g., in accordance with the command from the same host that also provided the program command. In response to receiving the program command and addresses, the program operation of the program command is performed.

In some implementations, the program operation of the program command on the memory device includes the memory controller transmitting or transferring the data to be programmed to the memory device. In some implementations, the memory controller performs the data transfer to the memory device in terms of allocation units. That is, to transfer the data to be programmed to the memory device, the memory controller partitions the data into a sequence of multiple allocation units (AUs) and sends the AUs one by one in an order according to the sequence of AUs. For example, as illustrated in FIG. 6, the memory controller sends data to the memory device in a sequence of AU0, AU1, AU2, and AU3.

An AU is a basic unit or the smallest amount of data that can be separately retrieved from or written to the memory system. In some implementations, AUs are of an equal size in the memory system. In some other implementations, the sizes of AUs can vary within the memory system, or vary from one memory system to another memory system. In some implementations, each AU has a size that is smaller than a size of a page. By way of non-limiting examples, each AU can have a size that is equal to one half, one fourth, or one eighth of a page size.

The program operation (including the data transfer from the memory controller to the memory device) takes a duration of time to complete. In general, different operations can have different characteristics such as execution priorities and can take or be associated with different durations of time to complete. To improve the overall execution efficiency or response time of the memory system, one program operation that has a higher execution priority than another program operation may preempt or interrupt the execution of the another program operation, even though the other program operation might have already been in execution or a command of the program operation that has a higher execution priority is received after a command of the another program operation that has a lower execution priority.

During execution of the program operation, the memory controller checks, for example, in a repeated manner, whether another command that relates to the memory system is received while performing the data transfer to the memory device for the program operation of the program command. The other command can request yet another command that has a higher execution priority than the current program operation.

In some cases, no other command is received, and the memory controller continues to transfer the current AU, or proceeds to transfer the next AU in the sequence to the memory device. In other cases, another command that relates to the memory system is received, e.g., from the same or different hosts.

While FIG. 6 illustrates the other command as a read command, more generally, the other command can be any command that requests an operation having a higher execution priority than the current program operation of the program command. In some implementations, the execution priorities of different operations can be determined based on durations of time to complete the different operations. For example, an operation requiring a shorter duration of time to complete can have a higher execution priority. In the example illustrated in FIG. 6, the other command can be an operation that takes a shorter duration of time to complete than the program operation of the program command. As an example, the other command can be a read operation that will take a shorter duration of time to complete than the program operation. As another example, the other command can be another program operation to write a smaller amount of data into the memory device that will take a shorter duration of time to complete than the current program operation to write a larger amount of data into the memory device. In some other implementations, the execution priorities of different operations can be determined, or otherwise based on, the importance of the operations, or other factors or preferences.

In the example illustrated in FIG. 6, in response to receiving or detecting a read command, a data transfer suspend command is issued by the memory controller to suspend the ongoing data transfer process for the program operation. In some cases, the data transfer suspend command is sent as soon as the read command is detected to limit a delay in servicing the read command. Thus, in some implementations, the memory controller can send the data transfer suspend immediately after the transfer of a current AU is completed, and before the transfer of the subsequent AU in the sequence of AUs begins. In some implementations, if the transfer of the current AU (e.g., AU0 shown in FIG. 6) is not completed yet, the memory controller can wait for the transfer of the current AU to finish and then proceed to handle handover to perform operations related to the received read command.

Following the data transfer suspend command, a read command corresponding to the received read command (e.g., from the host) is issued by the memory controller to execute a read operation of the read command. As shown in FIG. 6, during the program suspension stage, the read operation is executed. The read operation of the read command on the memory device includes the memory device transmitting the read data to the memory controller. In some implementations, such as where program data is transferred for program operations, the memory device similarly performs the read data transfer to the memory controller in terms of AUs.

In some cases, upon completion of the read operation, a resume last program data transfer command is issued by the memory controller. The resume last program data transfer command resumes the previously suspended program operation of the memory device, and more specifically resumes the data transfer process to enable continuation of the data transfer of the previously suspended program operation. In some implementations, the data transfer process can be resumed from a next AU (e.g., AU1) in the sequence of AUs at which the data transfer process had been suspended so that the transfer from the memory controller of the data to be programmed to the memory device can be completed.

In other cases, upon completion of the read operation, an abort last program operation command is additionally or alternatively issued by the memory controller. The abort last program operation command instructs the memory device to abort the previously suspended program operation. Upon receiving the abort last program operation command, the memory device can discard the already received AUs of data to be programmed during the last program operation.

Figure 7:
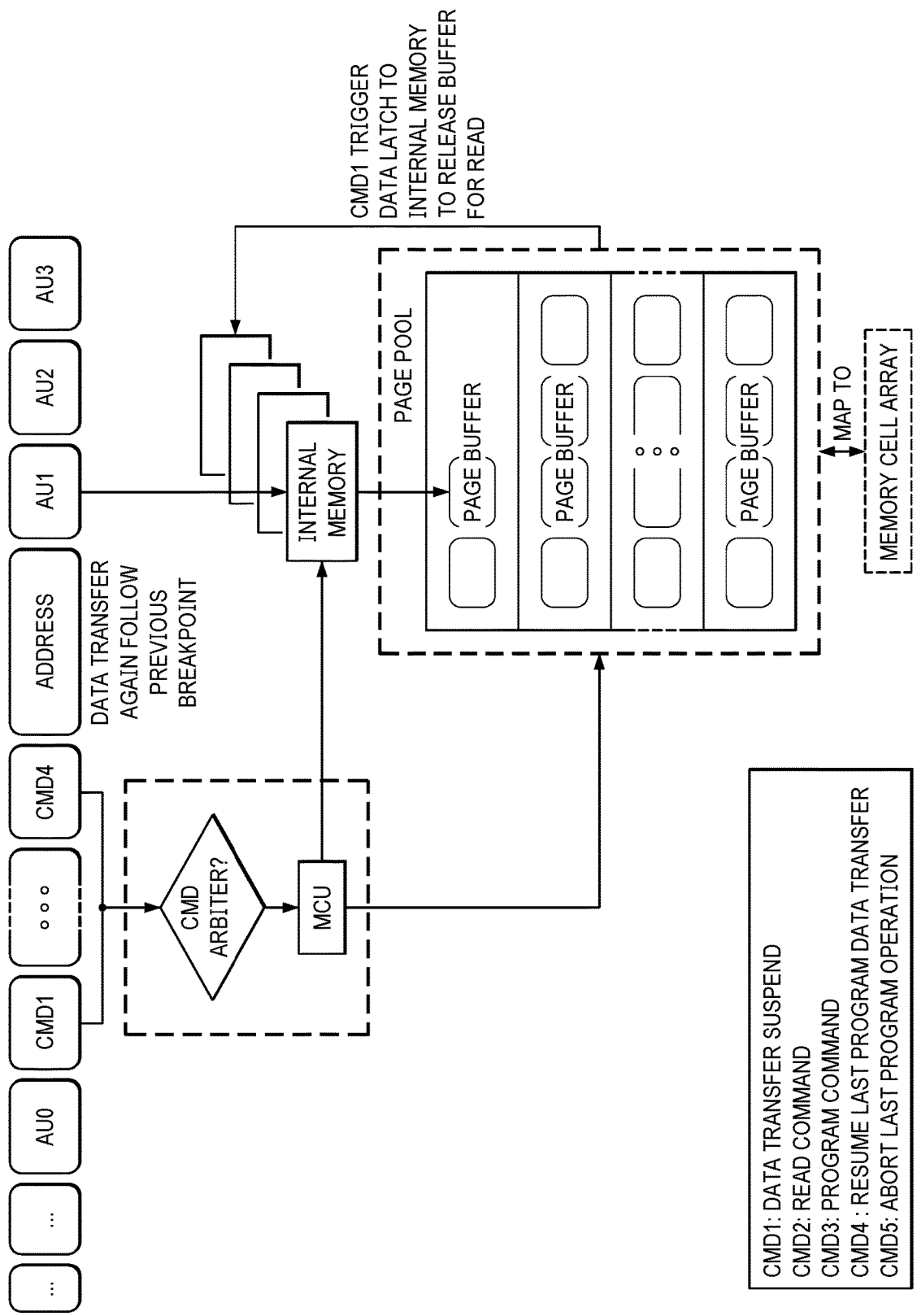
FIG. 7 illustrates another example graph of managing suspend and resume operations associated with a memory system, in accordance with some aspects of the present disclosure.

FIG. 7 illustrates another example graph of managing suspend and resume operations associated with a memory system, in accordance with some aspects of the present disclosure. FIG. 7 illustrates a numbers of operations including those performed by a memory device of the memory system (e.g., the memory device 104 of the memory system 102 or the memory device 502), for example, in a mixed write and read workload environment. The operations in FIG. 7 can correspond to the operations performed by the memory controller of the memory system as discussed in FIG. 6. The memory device can include an MCU, an internal memory, a page pool, and a memory cell array, similar to the MCU 510, the internal memory 520, the page pool 530, and the memory cell array 540 of the memory device 502, respectively.

As illustrated in FIG. 7, an AU of data (or simply referred to as an AU) is received by the memory device, e.g., from the memory controller. In some implementations, the AU can be an intermediate AU in a sequence of AUs that is being transferred for a program operation. The AU is referred to as an "intermediate" AU because it is not the last AU in the sequence of AUs, and that the transfer of the data to be programmed to the memory cells of memory device is not complete yet with the receipt of this AU by the memory device. In some implementations, during execution the program operation, the AU can be temporarily stored in an internal memory (e.g., the internal memory 520) of the memory device, and then transferred for storage in a buffer space allocated for the program operation in a page pool of the memory device.

After the AU is received, a command is received by the memory device, e.g., from the memory controller. In some implementations, the memory device can include a command arbiter. In some implementations, the command arbiter can be implemented as an integral or a separate part of the MCU of the memory device. In some implementations, the command arbiter can receive and process the command from the memory controller, for example, to determine a type of the command. In some implementations, the types of the commands can include, for example, a data transfer suspend command, a read command, a resume last program data transfer command, etc. Corresponding operations can be configured for the respective command. The MCU can perform the corresponding operations in accordance with the type of the command, e.g., based on MCU control signals. In some implementations, by using the command arbiter, the memory device can automatically identify the command and switch the read/program context, without breaking an internal state machine of the memory device. In some implementations, the command-based preempt interaction between the memory controller and the memory device can avoid chaos or malfunction of internal handle logical of the memory device.

In general, the command arbiter can be implemented by hardware, firmware, software, or a combination of these components in the memory device. In some implementations, the command arbiter can be implemented using hardware to handle the arbitration or determination, and does not impose any additional control action on the firmware of the memory device. In some implementations, such an implementation can further reduce latency and improve the response speed of the memory device.

In some cases where the command is a data transfer suspend command, the memory device suspends the data reception for the program operation, and stores data (including the already received AUs in the sequence of AUs for the program operation) and store context of an execution status for the program command to the internal memory of the memory device. For example, the context for the program command can include function, variables, and other object data and/or metadata data that describe a current execution status of the program command, such that the program command can be resumed after suspension. As an example, the context for the program command can include information including the programming page, the program pass, and the program/verify cycle at which the program operation is suspended, etc., which can be used for resuming the suspended program operation.

In some of these cases, the data transfer suspend command may be followed by a read command. Thus the memory device also allocates a buffer space in the page pool of the memory device for the read operation of the read command. In some implementations, the memory device can dynamically allocate respective buffer spaces in the page pool for the read operation and the program operation. In some implementations, the buffer space allocated for the read operation can be different than the one allocated for the program operation. For example, the respective buffer spaces can correspond to different page buffers (or page registers) in the page pool, different spaces in a same page buffer, or different spaces in different page buffers. In some implementations, the memory device can dynamically switch between the respective buffer spaces in the page pool for the read operation and the program operation, without inadvertently overwriting data or causing other malfunctions. In some implementations, such a page-buffer dynamic switch method at the memory device side can help ensure read and write operations can be handled properly, for example, in a mixed IO application. Execution of the read operation, which is performed while the program operation is suspended, can use this allocated buffer space to temporally store data read from the memory cells of the memory device. When the execution of the read operation is complete, the memory device returns an execution result of the read operation to the memory controller, including providing the read data stored allocated buffer space to the memory controller.

In some cases where the command is a resume last program data transfer command, the memory device resumes the previously suspended program operation of the memory device. In some implementations, the memory device restores the context from the internal memory and continues the data reception from the memory controller for the program operation. In particular, the memory device can resume the data reception process at the AU in the sequence of AUs at which the data reception process had been suspended so that the receipt by the memory device of the data to be programmed can be completed.

In some implementations, such as where the program operation was executed before suspension, these later received AUs can be temporarily stored in the internal memory of the memory device, and then transferred for storage in the buffer space allocated for the program operation in the page pool of the memory device. Once the memory device has received the entire sequence of AUs, the memory device can map the buffer space allocated for the program operation to the memory cells of the memory device. That is, the memory device programs the AUs stored in the buffer space into the memory cells. An AU can be mapped or unmapped. AUs can switch between being mapped and unmapped. A mapped AU can refer, for example, to an AU that has been assigned to a logical address space, e.g., used by the host, whereas an unmapped AU can refer, for example, to an AU that is not currently assigned to the logical address space used by the host, while a mapped AU can be currently used to store and retrieve data for the host.

In some cases where the command is an abort last program operation command, the memory device aborts the program operation (the data reception process for which was suspended to enable execution of the read operation). The memory device can reset the internal memory and release the buffer space allocated for the program operation in the page pool, thereby discarding all the data (including the already received AUs in the sequence of AUs) that has been saved for the program operation which is now instructed by the memory controller to abort.

Figure 8:
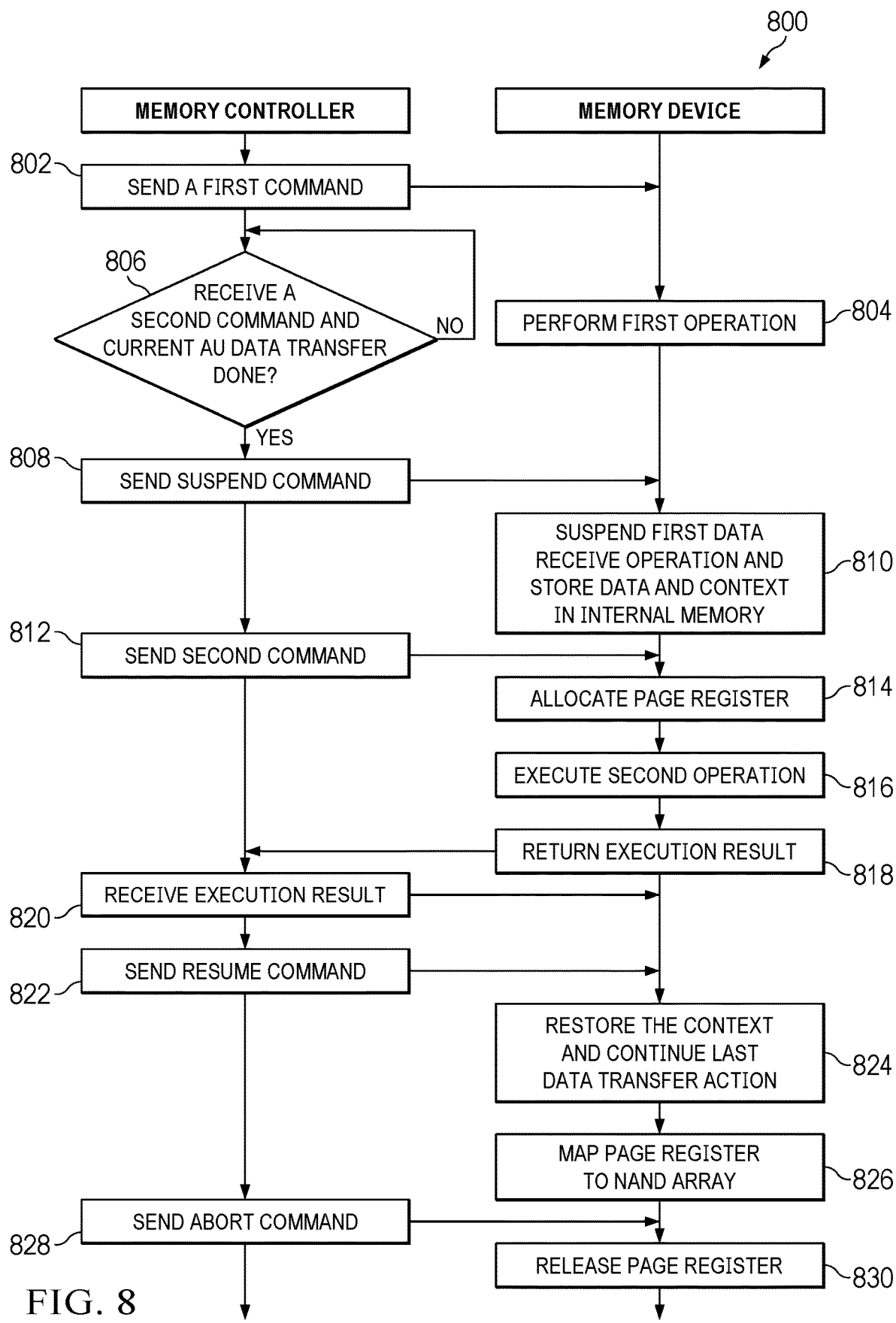
FIG. 8 is a swimlane diagram of an example process performed by a memory controller and a memory device, in accordance with some aspects of the present disclosure.

FIG. 8 is a swimlane diagram of an example process 800 for managing suspend and resume operations, in accordance with some aspects of the present disclosure. The example process 800 can be performed by a memory system (e.g., memory system 102). The example process 800 will be described as being performed by a memory system having a memory controller and a memory device, programmed appropriately in accordance with this disclosure. In some implementations, some or all of the operations in the example process 800 can be implemented based on the techniques described in connection with FIGS. 3-7. The operations shown in process 800 may not be exhaustive and other operations can be performed as well before, after, or between any of the illustrated operations. Further, some of the operations may be performed simultaneously, or in a different order than shown in FIG. 8.

The memory controller sends a first command to perform a first operation on the memory device (802). The first operation can be, for example, a program operation, an erase operation, or another operation to be performed by the memory device. For example, the program operation can be used to store data from a host to the memory system.

In response to the first command, the memory device begins execution of the first operation (804) on the memory device side. In the example process 800, in cases where the first operation is a program operation, execution of the program operation begins with receiving the data to be programmed to the memory device from the memory controller. The memory device can receive the data AU by AU in a sequence of AUs. To perform the program command, the memory device can allocate a buffer space for the program operation that is used to temporarily store the data to be programmed to the memory device.

While performing data transfer to the memory device for the program operation corresponding to the program command, the memory controller monitors and determines whether a second command is received from the host and whether data transfer in a current AU is completed (806). The second command may be associated, for example, with a second operation that has a higher execution priority than the first operation so that the first operation can be suspended and preempted by the second operation. As an example, the second command can be a read command that includes an identification of the memory device that is subject to the in-process or on-going first operation and request the memory device to read data from the memory device. As another example, the second command can be another program command that requests the memory device to write some data (e.g., a smaller amount of data or higher priority data) before the first program operation is completed.

In some implementations, the memory controller can perform the check of whether a second command is received from the host once, periodically, or from time to time. As an example, the memory controller can perform the check repeatedly at predetermined frequencies, e.g., every 1 us, 10 us, or 50 us. As another example, the memory controller can perform the check prior to or during the transfer of each AU in the sequence of AUs from the memory controller to the memory device.

In response to determining that no second command (or no command with a higher execution priority than that of the current first operation) is received from the host, the data transfer will continue and the next AU in the sequence of AUs will be transferred from the memory controller to the memory device.

In response to determining that the second command is received and that data transfer in a current AU (i.e., the AU currently being transferred at the time when the second command is received) is not complete, the memory controller can wait for the data transfer in the current AU to complete.

In response to determining that the second command is received and that data transfer in the current AU is complete, the memory controller sends a suspend command to the memory device to suspend the first operation (808).

In response to receiving the suspend command from the controller, the memory device executes a data transfer suspend operation. Execution of the suspend operation interrupts or halts the programming of the memory device (810). In some implementations, the memory device suspends the receipt of the data from the memory controller. In conjunction with the suspension of the data receipt, the memory device stores the already received data (including the already received AUs) for the first operation and context of an execution status for the first operation in an internal memory of the memory device.

By halting or interrupting an in-process first operation even before the data transfer of the first operation from the memory controller to the memory device is complete, the memory system can react more promptly to the second command (e.g., a read command) that has a higher execution priority. Advantageously, in some implementations, the first operation can be suspended substantially simultaneously with the identification of the second command to reduce or limit operation latency of the second operation, e.g., in view of applicable QoS metrics in a mixed write and read workload environment.

The memory controller sends the second command to perform the second operation to the memory device (812). Using the above example, the second command can be a read command and the second operation can be a read operation to read data from the memory device. In some implementations, the second command sent by the memory controller to the memory device may have a different format than the second command received by the memory controller from the host. For example, the second command sent by the memory controller to the memory device can be generated by the memory controller based on information included in the second command received by the memory controller from the host, for example, to indicate the read operation to read data from the memory device. The second command sent by the memory controller to the memory device can include, for example, additional or different data fields, control information, or have a different format than the second command received by the memory controller from the host.

In response to receiving the second command from the memory controller, the memory device proceeds with execution of the second operation immediately following the suspension of the first operation (e.g., the program operation), resulting in little to no delay in servicing the second command. Advantageously, in a memory system operating with a mixed workload, suspending the data transfer of the first operation enables the second operation to be serviced without having to wait for the transfer of the remaining AUs in the sequence of AUs for an in-progress first operation to complete. As a result, the latency of the memory system can be significantly reduced in some instances.

In some implementations, the memory device allocates a buffer space in the page pool for a read operation corresponding to the second command (814). The memory device executes the second operation using the buffer space in the page pool allocated for the second operation (816). For example, the memory device can use the buffer space to temporarily store the read data from the memory cells, and output the data to the internal memory of the memory device. The memory device returns an execution result of the second operation to the controller (818). For example, in cases where the second operation is a read operation, the memory device can provide the read data stored in the internal memory to the memory controller. In addition, in some cases, the memory device can release the buffer space allocated for the second operation following the completion of the second operation.

The memory controller receives the execution result of the second operation from the memory device (820). For example, the memory controller can receive the data obtained from the memory cells of the memory device as a result of performing the second operation.

In some implementations, the memory controller sends a resume command to the memory device to resume the first operation executed in step 802 and suspended in step 808 (822).

In response to receiving the resume command from the controller, the memory device restores the context for the first operation from the internal memory of the memory device, and continues to execute the first operation. For example, in cases where the first operation is a program operation, the resume command can resume the data transfer process to enable resumption of the data transfer of the previously suspended program operation (824). In particular, the data transfer process can be resumed from the AU in the sequence of AUs at which the data transfer process had been suspended so that the data transfer from the memory controller to the memory device can be completed.

Just as the memory device performs the program operation before the suspension, the memory device can store the later received AUs in the buffer space allocated for the program operation. When the data transfer is complete, the memory device maps the buffer space allocated for the program operation to the memory cells of the memory device (826). That is, the memory device can program the AUs stored in the buffer space into the memory cells.

In some implementations, the memory controller sends an abort command to abort the first operation (828). The first operation may or may not have been completed by the time the abort command is sent. In some implementations, the memory controller may directly proceed to perform step 828 (skipping step 822) after step 820. In some other implementations, the memory controller may first perform step 822 and then perform step 828 subsequently.

In response to receiving the abort command from the memory controller, the memory device aborts the first operation, which may still be in-progress. In some implementations, aborting the first operation can include releasing the buffer space in the page pool or any other resources that have previously been allocated for the first operation (830).

Figure 9:
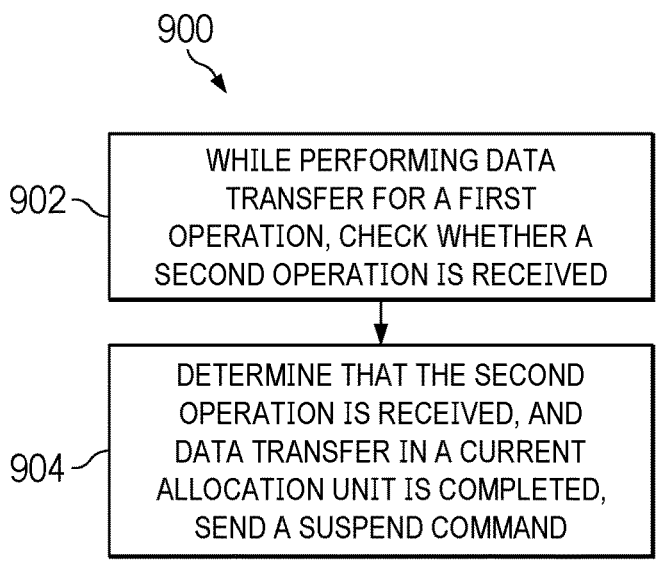
FIG. 9 is a flowchart of an example process performed by a memory controller, in accordance with some aspects of the present disclosure.

FIG. 9 is a flowchart of an example process 900 for managing suspend and resume operations, in accordance with some aspects of the present disclosure. The example process 900 can be performed by any suitable memory device disclosed herein, such as the memory controller 106 in FIG. 1 and FIGS. 2A and 2B, memory controller 306 in FIG. 3 or the memory controller 406 in FIG. 4. The example process 900 will be described as being performed by a memory controller of a memory system having the memory controller and a memory device, programmed appropriately in accordance with this disclosure. In some implementations, some or all of the operations in the example process 900 can be implemented based on the techniques described in connection with FIGS. 3-7. The operations shown in method 900 may not be exhaustive and that other operations can be performed as well before, after, or between any of the illustrated operations. Further, some of the operations may be performed simultaneously, or in a different order than shown in FIG. 9.

While performing data transfer to the memory device for a first operation corresponding to a first command, the memory controller monitors and checks whether a second command is received (902). In some cases, the first command can be a program command to perform a program operation. The program operation can be used to store data from a host to the memory system. In some cases, the second command can be a read command to perform a read operation. The read operation can be used to read data from the memory system by the host. In some other cases, the second command can be another command to perform another read operation store (e.g., a smaller amount of) data from the host to the memory system.

The data transfer to the memory device can be performed in terms of AUs. That is, to transfer the data for the first operation (e.g., to transfer the data to be programmed to the memory device), the memory controller partitions the data into a sequence of multiple AUs and sends the AUs one by one in an order according to the sequence of AUs.

The memory controller can, for example, repeatedly, i.e., at each of multiple time points, check whether the second command is received while performing the data transfer to the memory device for the first operation. For example, the memory controller can perform the check at predetermined frequencies, e.g., every 1 us, 10 us, or 50 us. As another example, the memory controller can perform the check prior to or during the transfer of each AU in the sequence of AUs from the memory controller to the memory device.

In response to determining that the second command is received and that the data transfer in the current AU is not completed, the memory controller waits for the data transfer in the current AU to be completed.

In response to determining that the second command is received and that data transfer in a current AU is completed, the memory controller sends a suspend command to the memory device (904). The suspend command can interrupt or halt the ongoing data transfer for the first operation immediately after the current AU is transferred.

Figure 10:
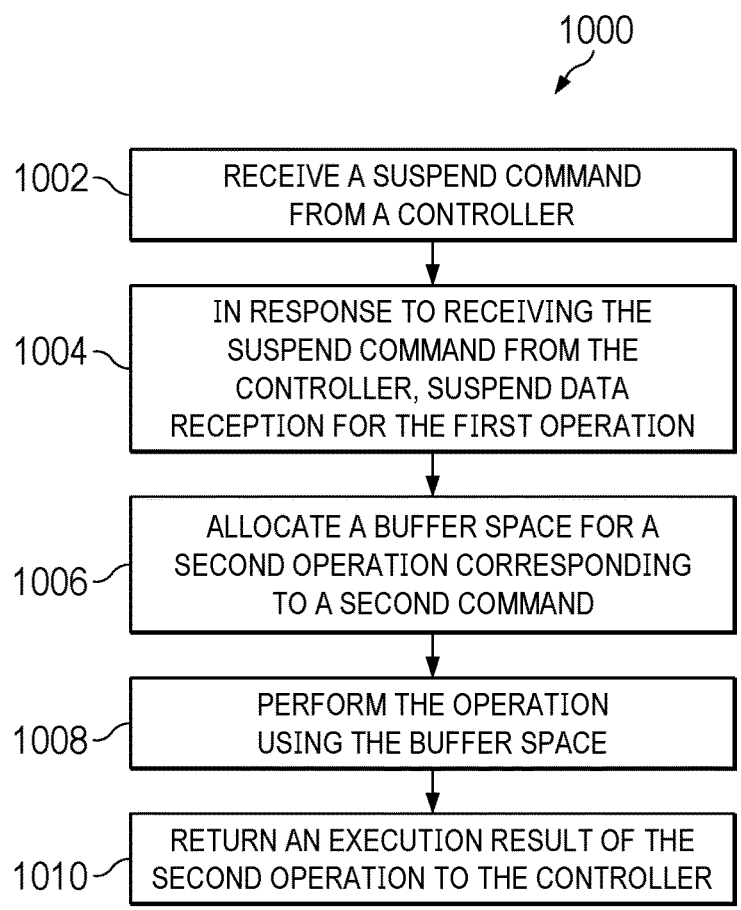
FIG. 10 is a flowchart of an example process performed by a memory device, in accordance with some aspects of the present disclosure.

FIG. 10 is a flowchart of an example process 1000 for managing suspend and resume operations, in accordance with some aspects of the present disclosure. The example process 1000 can be performed by any suitable memory device disclosed herein, such as the memory device 104 in FIG. 1 and FIGS. 2A and 2B, memory device 304 in FIG. 3, or memory device 502 in FIG. 5. The example process 1000 will be described as being performed by a memory device of a memory system having a memory controller and the memory device, programmed appropriately in accordance with this disclosure. In some implementations, some or all of the operations in the example process 1000 can be implemented based on the techniques described in connection with FIGS. 3-7. The operations shown in method 1000 may not be exhaustive and that other operations can be performed as well before, after, or between any of the illustrated operations. Further, some of the operations may be performed simultaneously, or in a different order than shown in FIG. 10.

While performing data reception from a memory controller for a first operation corresponding to a first command, the memory device receives a suspend command from the controller to suspend the data reception (1002). Performing the data reception can include storing the already received AUs into a first buffer space in a page pool of the memory device that has been allocated for the first operation. For example, the first buffer space can be one or more page buffers in the page pool 530 of the memory device 502 of FIG. 5.

In response to receiving the suspend command from the controller, the memory device suspends the data reception for the first operation (1004). The data reception can be suspended once the current AU in the sequence of AUs is received. In some cases, suspending data reception from the controller includes saving context of an execution status of the first operation into an internal memory of the memory device.

The memory device allocates a second buffer space in a page pool of the memory device for a second operation corresponding to a second command (1006). For example, the second buffer space can be one or more page buffers in the page pool 530 of the memory device 502 of FIG. 5. In some cases, the second buffer space can be a different buffer space than a first buffer space allocated for the first operation in the page pool. For example, the first and second buffer spaces can correspond to different page buffers in the page pool (e.g., different page buffers in the page pool 530 of the memory device 502 of FIG. 5), different spaces in a same page buffer (e.g., different spaces in a page buffer on the top row of the page pool 530 of the memory device 502 of FIG. 5), or different spaces in different page buffers.

The memory device performs the second operation using the second buffer space allocated for the second operation (1008). In particular, the memory device can perform the second operation immediately following the suspension of the first operation. In cases where the second operation is a read operation, the memory device can store the data read from the memory cells of the memory device in the second buffer space.

The memory device returns an execution result of the second operation to the memory controller (1010). In cases where the second operation is a read operation, the memory device can provide the read data to the memory controller.

According to one aspect of the present disclosure, a system includes a memory device and a controller is disclosed. The controller is configured to: while performing data transfer to the memory device for a first operation corresponding to a first command, check whether a second command is received, wherein performing the data transfer to the memory device comprises performing the data transfer in terms of AUs; and in response to determining that the second command is received and that data transfer in a current AU is completed, send a suspend command to the memory device. The memory device is configured to: in response to receiving the suspend command from the controller, suspend data reception for the first operation; allocate a buffer space for a second operation corresponding to the second command; perform the second operation using the buffer space allocated for the second operation; and return an execution result of the second operation to the controller In some implementations, the controller is configured to: in response to determining that the second command is received and that the data transfer in the current AU is not completed, wait for the data transfer in the current AU to be completed.

In some implementations, the controller is configured to: repeatedly check whether the second command is received while performing the data transfer to the memory device for the first operation.

In some implementations, performing the first operation comprises transferring a plurality of AUs of data from the controller to the memory device, and the current AU is not a last AU of the plurality of AUs of data.

In some implementations, each AU has a size that is smaller than a page size.

In some implementations, each AU has a size that is equal to one fourth of a page size.

In some implementations, wherein the controller is configured to: in response to receiving the execution result of the second operation from the memory device, send a resume command to the memory device to resume the first operation; and wherein the memory device is configured to: in response to receiving the resume command from the controller, continue the data reception for the first operation.

In some implementations, the memory device is further configured to: in response to receiving the resume command from the controller, restore context of the first operation from a first buffer space.

In some implementations, the controller is configured to: in response to receiving the execution result of the second operation from the memory device, send an abort command to the memory device to abort the first operation; and wherein the memory device is configured to: in response to receiving the abort command from the controller, release the first buffer space that has previously been allocated for the first operation, wherein the first buffer space is different from the buffer space allocated for the second operation.

In some implementations, the controller is configured to: in response to completing the second operation, release the buffer space allocated for the second operation.

According to another aspect of the present disclosure, a method performed by a system that includes a memory device and a controller is disclosed. The method includes: while performing data transfer to the memory device for a first operation corresponding to a first command, checking, by the controller, whether a second command is received, wherein performing the data transfer to the memory device comprises performing the data transfer in terms of AUs; in response to determining that the second command is received and that data transfer in a current AU is completed, sending, by the controller, a suspend command to the memory device; in response to receiving the suspend command from the controller, suspending, by the memory device, data reception for the first operation; allocating, by the memory device, a buffer space for a second operation corresponding to the second command; performing, by the memory device, the second operation using the buffer space allocated for the second operation; and returning, by the memory device, an execution result of the second operation to the controller.

In some implementations, the method further comprises: in response to determining that the second command is received and that the data transfer in the current AU is not completed, waiting for the data transfer in the current AU to be completed.

In some implementations, the method further comprises: repeatedly checking whether the second command is received while performing the data transfer to the memory device for the first operation.

In some implementations, the method further comprises: in response to receiving the execution result of the second command from the memory device, sending, by the controller, a resume command to the memory device to resume the first operation; and in response to receiving the resume command from the controller, continuing, by the memory device, the data reception for the first operation.

In some implementations, the method further comprises: in response to receiving the resume command from the controller, restoring context of the first operation from an internal memory.

In some implementations, the method further comprises: in response to receiving the execution result of the second operation from the memory device, sending, by the controller, an abort command to the memory device to abort the first operation; and in response to receiving the abort command from the controller, releasing, by the memory device, a first buffer space that has previously been allocated for the first operation, wherein the first buffer space is different from the buffer space allocated for the second operation.

In some implementations, the method further comprises: in response to completing the second operation, releasing the buffer space allocated for the second operation.

According to another aspect of the present disclosure, a controller for controlling a memory device is disclosed. The controller includes at least one processor coupled to at least one memory storing programming instructions that, when executed by the at least one processor, cause the controller to perform operations comprising: while performing data transfer to the memory device for a first operation corresponding to a first command, checking whether a second command is received, wherein performing the data transfer to the memory device comprises performing the data transfer in terms of AUs; and in response to determining that the second command is received and that data transfer in a current AU is completed, sending a suspend command to the memory device In some implementations, the operations comprise: in response to determining that the second command is received and that the data transfer in the current AU is not completed, waiting for the data transfer in the current AU to be completed.

In some implementations, the operations comprise: repeatedly checking whether the second command is received while performing the data transfer to the memory device for the first operation.

In some implementations, the operations comprise: in response to receiving the execution result of the second operation from the memory device, sending a resume command to the memory device to resume the first operation.

In some implementations, the operations comprise: in response to receiving the execution result of the second operation from the memory device, sending an abort command to the memory device to abort the first operation.

According to still another aspect of the present disclosure, a memory device is disclosed. The memory device includes at least one processor coupled to at least one memory storing programming instructions; at least one internal memory; at least one buffer space; and an array of memory cells, and wherein the programming instructions, when executed by the at least one processor, cause the memory device to perform operations comprising: while performing data reception from a controller for a first operation corresponding to a first command, receiving a suspend command from the controller to suspend the data reception; in response to receiving the suspend command from the controller, suspending the data reception for the first operation; allocating a buffer space of the at least one buffer space for a second operation corresponding to a second command; performing the second operation using the buffer space allocated for the second operation; and returning an execution result of the second operation to the controller.

In some implementations, suspending data reception from the controller for the first operation comprises saving context of an execution status of the first operation into the at least one internal memory.

In some implementations, performing the data reception from the controller for the first operation comprises allocating a first buffer space of the at least one buffer space for the first operation, wherein the first buffer space is different from the buffer space allocated for the second operation.

In some implementations, the operations comprise: in response to receiving a resume command from the controller to resume the first operation, restoring context of the first operation from the at least one internal memory; continuing the data reception from the controller for the first operation; saving data to the first buffer space allocated for the first operation; and mapping the first buffer space allocated for the first operation to the array of memory cells.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A system comprising:
   a memory device; and
   a controller, wherein:
     the controller is configured to:
       while performing data transfer to the memory device for a first operation corresponding to a first command, check whether a second command is received, wherein performing the data transfer to the memory device comprises performing the data transfer by transferring a plurality of allocation units;
       after the second command is received, determine whether data transfer in a current allocation unit of the plurality of allocation units is completed;
       in response to determining that the second command is received and that data transfer in the current allocation unit is completed, send a suspend command to the memory device, wherein the suspend command is sent before beginning transfer of a next allocation unit in a sequence of allocation units; and the memory device is configured to:
in response to receiving the suspend command from the controller, suspend data reception for the first operation;
allocate a buffer space for a second operation corresponding to the second command;
perform the second operation using the buffer space allocated for the second operation; and
return an execution result of the second operation to the controller.

2. The system of claim 1, wherein the controller is configured to:
after the data transfer in the current allocation unit is completed, send the suspend command to the memory device.

3. The system of claim 1, wherein the controller is configured to:
repeatedly check whether the second command is received while performing the data transfer to the memory device for the first operation.

4. The system of claim 1, wherein the current allocation unit is not a last allocation unit of the plurality of allocation units.

5. The system of claim 1, wherein each allocation unit has a size that is smaller than a page size.

6. The system of claim 1, wherein each allocation unit has a size that is equal to one fourth of a page size.

7. The system of claim 1,
wherein the controller is configured to:
in response to receiving the execution result of the second operation from the memory device, send a resume command to the memory device to resume the first operation; and
wherein the memory device is configured to:
in response to receiving the resume command from the controller, continue the data reception for the first operation.

8. The system of claim 7, wherein the memory device is further configured to:
in response to receiving the resume command from the controller, restore context of the first operation from a first buffer space.

9. The system of claim 8, wherein the controller is configured to:
in response to receiving the execution result of the second operation from the memory device, send an abort command to the memory device to abort the first operation; and
wherein the memory device is configured to:
in response to receiving the abort command from the controller, release the first buffer space that has previously been allocated for the first operation, wherein the first buffer space is different from the buffer space allocated for the second operation.

10. The system of claim 1, wherein the controller is configured to:
in response to completing the second operation, release the buffer space allocated for the second operation.

11. A method performed by a system comprising a memory device and a controller, wherein the method comprises:
while performing data transfer to the memory device for a first operation corresponding to a first command, checking, by the controller, whether a second command is received, wherein performing the data transfer to the memory device comprises performing the data transfer by transferring a plurality of allocation units;
after the second command is received, determining whether data transfer in a current allocation unit of the plurality of allocation units is completed;
in response to determining that the second command is received and that data transfer in the current allocation unit is completed, send a suspend command to the memory device, wherein the suspend command is sent before beginning transfer of a next allocation unit in a sequence of allocation units;
in response to receiving the suspend command from the controller, suspending, by the memory device, data reception for the first operation;
allocating, by the memory device, a buffer space for a second operation corresponding to the second command;
performing, by the memory device, the second operation using the buffer space allocated for the second operation; and
returning, by the memory device, an execution result of the second operation to the controller.

12. The method of claim 11, further comprising:
after the data transfer in the current allocation unit is completed, sending the suspend command to the memory device.

13. The method of claim 11, further comprising:
repeatedly checking whether the second command is received while performing the data transfer to the memory device for the first operation.

14. The method of claim 11, further comprising:
in response to receiving the execution result of the second command from the memory device, sending, by the controller, a resume command to the memory device to resume the first operation; and
in response to receiving the resume command from the controller, continuing, by the memory device, the data reception for the first operation.

15. The method of claim 14, further comprising:
in response to receiving the resume command from the controller, restoring context of the first operation from an internal memory.

16. The method of claim 11, further comprising:
in response to receiving the execution result of the second operation from the memory device, sending, by the controller, an abort command to the memory device to abort the first operation; and
in response to receiving the abort command from the controller, releasing, by the memory device, a first buffer space that has previously been allocated for the first operation, wherein the first buffer space is different from the buffer space allocated for the second operation.

17. The method of claim 11, further comprising:
in response to completing the second operation, releasing the buffer space allocated for the second operation.

18. A controller for controlling a memory device, the controller comprising:
at least one processor coupled to at least one memory storing programming instructions that, when executed by the at least one processor, cause the controller to perform operations comprising:
while performing data transfer to the memory device for a first operation corresponding to a first command, checking whether a second command is received, wherein performing the data transfer by transferring a plurality of allocation units;

after the second command is received, determining whether data transfer in a current allocation unit of the plurality of allocation units is completed; and in response to determining that the second command is received and that data transfer in the current allocation unit is completed, send a suspend command to the memory device, wherein the suspend command is sent before beginning transfer of a next allocation unit in a sequence of allocation units.

19. The controller of claim 18, wherein the operations comprise:

after the data transfer in the current allocation unit is completed, sending the suspend command to the memory device.

20. A memory device comprising:
at least one processor coupled to at least one memory storing programming instructions;
at least one internal memory;
at least one buffer space; and
an array of memory cells, and wherein the programming instructions, when executed by the at least one processor, cause the memory device to perform operations comprising:

while performing data reception from a controller for a first operation corresponding to a first command, receiving a suspend command from the controller to suspend the data reception;

in response to receiving the suspend command from the controller, suspending the data reception for the first operation, wherein the suspend command is received after data transfer in a current allocation unit of the plurality of allocation units is completed and before beginning transfer of a next allocation unit in a sequence of allocation units;

allocating a buffer space of the at least one buffer space for a second operation corresponding to a second command;

performing the second operation using the buffer space allocated for the second operation; and returning an execution result of the second operation to the controller.

\* \* \* \* \*